United States Patent [19]
Kirby et al.

[11] 3,753,753
[45] Aug. 21, 1973

[54] METHOD OF TREATING CLAY TO IMPOVE OPTICAL PROPERTIES

[75] Inventors: David B. Kirby, Midland; Roger D. Kroening, Bay City, both of Mich.

[73] Assignee: The Dow Chemical Company, Midland, Mich.

[22] Filed: Feb. 12, 1971

[21] Appl. No.: 115,114

[52] U.S. Cl. ............................ 106/288 B, 106/306
[51] Int. Cl. .......................................... C08h 17/06
[58] Field of Search .................... 106/72, 73, 288 B, 106/306

[56] References Cited
UNITED STATES PATENTS

| | | | |
|---|---|---|---|
| 2,268,131 | 12/1941 | Barker et al. | 106/72 |
| 2,955,051 | 10/1960 | Maloney et al. | 106/72 |
| 3,115,416 | 12/1963 | Chavrier | 106/73 |
| 3,205,082 | 9/1965 | Buffett | 106/73 |
| 3,446,348 | 5/1969 | Sennett et al. | 106/72 |

Primary Examiner—James E. Poer
Attorney—Griswold & Burdick, Stephen S. Grace and Lloyd S. Jowanovitz

[57] ABSTRACT

A method of improving the optical properties of clay which comprises forming an aqueous mixture of clay with magnesium oxide, and aging the mixture.

5 Claims, No Drawings

METHOD OF TREATING CLAY TO IMPOVE OPTICAL PROPERTIES

BACKGROUND OF THE INVENTION

Clays are often used as components in pigment formulations, for example, for paper coatings. The optical properties of the clay have been upgraded by various methods including acid treatment, mechanical pulping, water washing, size classification, calcination and the addition of other pigment grade materials such as titanium dioxide and calcium carbonate.

The term "clay", as used herein, refers to kaolin type clay, the variety of clay generally used as a pigment.

An object of the present invention is to provide a method of treating clay to improve its optical properties.

THE INVENTION

The present method comprises forming an aqueous mixture of clay and magnesium oxide (MgO), and aging the mixture. The clay so treated has improved optical properties, e.g. scattering coefficient.

In carrying out the present method the aqueous clay-MgO is formed, for example, by adding the MgO to a clay slurry. Alternatively, the clay, which is normally water washed and spray dried, is admixed with an aqueous slurry of MgO, or the clay and MgO are mixed dry and the water added to form the aqueous mixture or slurry. Although any addition of MgO will have a beneficial effect, preferably the MgO is added in an amount from about 0.5 to about 25 weight per cent and more preferably from about 1 to about 2 weight per cent, based on the total weight of clay and MgO. Also preferably, the MgO has a surface area of at least about 2 square meters per gram ($m^2/g$).

The aqueous, clay-MgO mixture is aged at room or, preferably, elevated temperature, e.g. from about 40°C to about 180°C. Above 100°C, super atmospheric pressure is necessary. The amount of MgO and the time (preferably about 1 to about 24 hours) and aging temperature can be adjusted to achieve a clay with the desired optical prpoerties.

Other ingredients or pigment compositions, such as starch, or latex or other binders, dispersants, other pigments, and the like can be admixed with the clay before or after addition of the MgO, or before or after aging of the clay-MgO slurry.

The treated clay can be spray dried for packaging as a free flowing solid material or dewatered to about 60 per cent solids for wet shipping.

In the examples brightness and opacifying power of various pigment compositions were determined by use of conventional apparatus as follows. A Photovolt reflectometer was employed to compare the reflectance of a dry test coating specimen relative to a standard dry MgO specimen which is considered to have a 100 per cent reflectance. The opacifying power of the pigment composition was estimated by the Mitton-Jacobsen method, whereby a coating is cast on a black glass panel with a Bird doctor blade at a thickness of about one and one half mils. A 5 sq. in. area of this slightly translucent film is measured for reflectance, $R_B$, and likewise the reflectance $R\infty$ of a thick layer over white glass. These readings are then converted by means of published graphs (Official Digest, "Journal of Paint Technology and Engineering", Vol 35, Sept. 1963, p. 871) into values of scattering power, the measured area of the coating is then removed from the black glass and weighed, thus enabling expression of the scattering coefficient, S value, in terms of an accurately known coating weight unit (lbs. per TAPPI ream).

The standard pigment composition tested was as follows:

| | |
|---|---|
| clay plus MgO | 100 grams |
| tetrasodium pyrophosphate (3% solution) | 10 grams |
| Na salt of polyacrylic acid (25% solution) | 4 grams |
| latex binder (25% solution) | 60 grams |
| distilled water 156 grams | |

EXAMPLES 1–4

Twenty-five Grams MgO (made from $Mg(OH)_2$ calcined at about 950°C) having a surface of about 4.5 $m^2/g$ was admixed with 75 grams of Georgia kaolin clay (No. 1 coating grade) and water (156 grams) and aged for various periods of time at about room temperature (29°C). The remaining pigment composition ingredients were added and the S value measured. For comparison, a pigment composition without MgO added was also tested. Table I shows the results of these tests.

TABLE I

| Example | Clay-g. | MgO-g | Aging Time-hrs. | S |
|---|---|---|---|---|
| A | 100 | — | — | 0.13 |
| B | 100 | — | 20 | 0.13 |
| 1 | 75 | 25 | — | 0.16 |
| 2 | 75 | 25 | 4 | 0.16 |
| 3 | 75 | 25 | 24 | 0.23 |
| 4 | 75 | 25 | 40 | 0.23 |

The clay-containing pigment composition was not affected by aging (Example B). The addition of MgO to the clay improved the S value by about 20 percent (Example A vs Example 1). Aging the MgO-clay slurry for 24 hours nearly doubled the S value over the clay pigment (Example A vs Example 3). Similar S values can be achieved in shorter aging periods at elevated temperatures, e.g. 16 hours at 50°C or 1 to 4 hours at 80°C. Other clay-MgO samples showed substantial increase in S value over the clay pigment after aging for short periods, e.g. 1 hour, even at room temperature.

EXAMPLES 5–8

Pigment composition samples with varying amounts of MgO were prepared in accordance with Examples 1–4. The Clay-MgO slurries were aged for 42 hours at 29°C. Table II presents the results.

TABLE II

| Example | % MgO | S |
|---|---|---|
| C | 0 | 0.13 |
| 5 | 1 | 0.18 |
| 6 | 5 | 0.21 |
| 7 | 15 | 0.22 |
| 8 | 25 | 0.23 |

Even small amounts of MgO, e.g. 1 percent, improve the S value of the clay (Example 5). The effect of the MgO addition apepars to level off after 5 percent addition (Examples 6–8).

EXAMPLES 9–11

A series of pigment compositions (containing 25 percent MgO) were prepared by admixing all the ingredients together. S values were obtained for the as admixed composition and composition aged for 24 hours at 29°C. Various magnesium oxides were employed:

Type A - Mg(OH)$_2$ calcined at 925°C, 5.5 m$^2$/g surface area; Type B - Mg(OH)$_2$ calcined at 950°C, 4.5 m$^2$/g surface area; Type C - Mg(OH)$_2$ calcined at 975°C, 4.1 m$^2$/g surface area. Table III presents the results.

TABLE III

| Example | MgO Type | S — as admixed | S — aged |
|---------|----------|----------------|----------|
| 9       | A        | 0.16           | 0.24     |
| 10      | B        | 0.16           | 0.23     |
| 11      | C        | 0.16           | 0.19     |

It is readily apparent from these and the previous examples that an interaction between the MgO and the clay is taking place which has a significant beneficial effect on the optical properties of the clay. It is also evident that aging the clay - MgO - water mixture, with or without other pigment composition ingredients, further enhances the S value of the pigment.

Other delaminated clay pigment samples were prepared in accordance with the present invention and compared with samples of unmodified, delaminated clay with respect to various other pigment properties.

In one such test, 26 pound publication paper coated with a deliminated clay containing about 2.5 weight per cent magnesium oxide was compared with a similar paper coated with unmodified, delaminated clay at similar coating weights. The opacity was determined before and after super calendering. The super calendering was carried out at 150°F, 1,500 pounds per lineal inch (pli) in 6 nips or passes. Such super calendering is known to reduce the opacity of various coating pigments. This phenomenon was noted both with the modified and unmodified clay coatings. It was observed that for given coating weight the amount by which the opacity was reduced by the super calendering was essentially the same for both the modified and unmodified coatings. In another test a 26 pound publication grade paper coated with delaminated clay containing 1.5 weight per cent magnesium oxide was compared in the super calendered condition with a similar paper coated with unmodified, delaminated clay. At any given coating weight the paper coated with the magnesium oxide-clay composition had superior opacity to the paper coated with the unmodified clay.

In another experiment ink receptivity and gloss ink holdout of paper coated with modified and unmodified clay were compared. The paper coated with delaminated clay containing 1.5 weight per cent magnesium oxide has a lower reflectance value of a K + N ink smear indicating increased ink receptivity. While the gloss ink holdout was somewhat reduced for the modified clay coated paper, this was still roughly equivalent to some conventional clay coated papers.

Paper coated with the modified clay composition was also tested for pick resistance, i.e. increased binder demand. Results indicated no decreased pick resistance or change in binder demand over an unmodified clay coated paper.

A paper coated with the magnesium oxide containing clay has a high calendered gloss. This is measured in terms of reflectance of the coated paper from a 75° angle after super calendering (using a mirror as the basis for 100 percent reflectance). The paper coated with the delaminated clay had a calendered gloss value of 66. The paper coated with a magnesium oxide containing clay had a calendered gloss of 75.

These further tests indicate the advantages and capabilities of the magnesium oxide-containing clay prepared in accordance with the present invention as used in a paper coating pigment formulation.

What is claimed is:

1. A method which comprises:
    a. forming an aqueous mixture of kaolin and magnesium oxide wherein the magnesium oxide is admixed in an amount of from about 0.5 to about 25 weight percent based on the total amount of kaolin and magnesium oxide; and
    b. aging the mixture, thereby to produce a kaolin with improved optical properties.

2. The method of claim 1 wherein the mixture is aged for a time within the range of from about 1 to about 24 hours.

3. The method of claim 1 wherein the mixture is aged at a temperature within the range of from about 40°C to about 180°C.

4. The method of claim 1 wherein the magnesium oxide is admixed in an amount of from about 1 to about 2 weight per cent.

5. Aged kaolin with improved optical properties produced by the method of claim 1.

* * * * *